(No Model.)
W. J. SIMONIS.
PEDAL BICYCLE SUPPORT.
No. 586,629. Patented July 20, 1897.
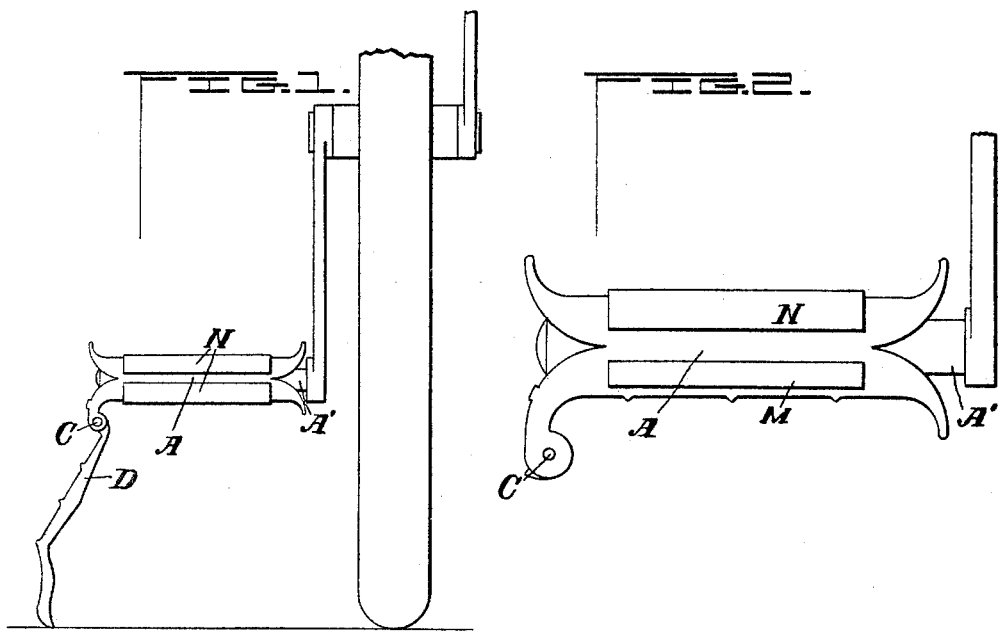
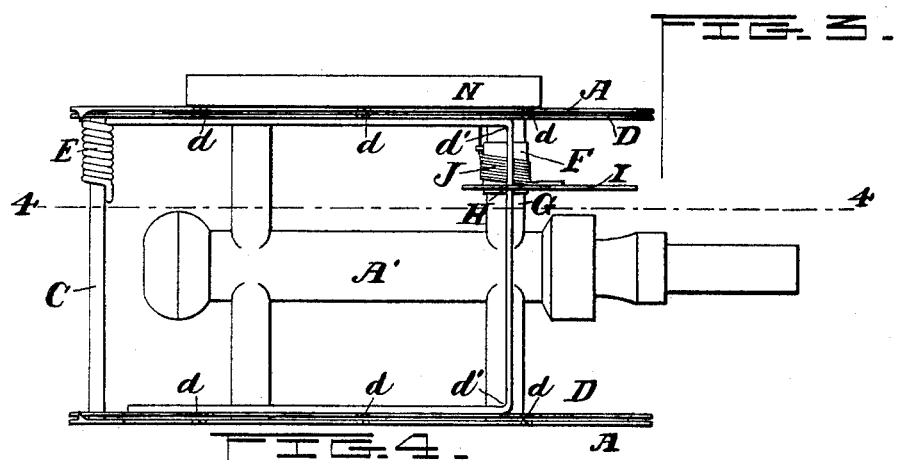
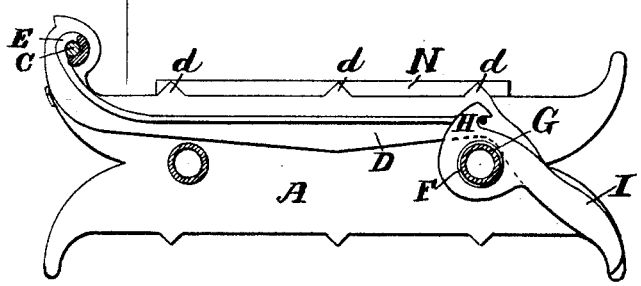
Witnesses
J. G. Tabler
K. A. Ivan
Inventor
William J. Simonis
by John Hedderburn
Attorney

UNITED STATES PATENT OFFICE.

WILLIAM J. SIMONIS, OF CAREY, OHIO.

PEDAL BICYCLE-SUPPORT.

SPECIFICATION forming part of Letters Patent No. 586,629, dated July 20, 1897.

Application filed May 19, 1896. Serial No. 592,173. (No model.)

*To all whom it may concern:*

Be it known that I, WILLIAM J. SIMONIS, a citizen of the United States, residing at Carey, in the county of Wyandot and State of Ohio, have invented certain new and useful Improvements in Pedal Bicycle-Supports; and I do hereby declare the following to be a full, clear, and exact description of the invention, such as will enable others skilled in the art to which it appertains to make and use the same.

This invention relates to certain new and useful improvements in bicycle-supports; and it has for its objects, among others, to provide a simple and cheap device mounted upon and carried by the pedal, whereby the bicycle may be supported in a vertical position when desired. For instance, if the rider desires to stop and converse with a friend all that it is necessary to do is to drop the support, when the bicycle will be held against falling over. I provide a support adapted to fold parallel with the pedal when not in use and to extend at substantially a right angle thereto when in operative position. Means are provided for holding or locking it in its closed position.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is an elevation of a portion of a bicycle, showing my improvement applied. Fig. 2 is a view showing the support closed. Fig. 3 is a plan of the pedal with the support thereon. Fig. 4 is a section through the pedal and the support.

Like letters of reference indicate like parts in the several views.

Referring now to the details of the drawings by letter, A designates the pedal, and A' the pedal-arm. This pedal may be of any of the well-known or approved forms of construction and of course adapted to operate in the usual way. Mounted on one end of the pedal is a shaft C, on which is pivotally mounted the support D, which consists of the parallel arms having, preferably, the projections $d$, coincident with those of the pedal, as shown, and adapted to lie thereagainst when the support is in its closed position.

E is a spring having one end coiled around this shaft any required number of times and thence extending along the side arms of the support, to which it is secured, and extending across near the free ends thereof joins the same and forms a brace therefor, as shown at $d'$. This spring serves to normally keep the support in its extended position and forces the same into such position as soon as it is released from its catch. This catch consists of a sleeve F, mounted upon a cross portion G of the pedal and adapted to rock freely thereon. This sleeve has an arm H extending therefrom, and this arm is formed with a lever I, adapted to engage the cross portion of the spring on the support, so as to be engaged therewith and held thereby as the support is thrown into its closed position.

J is a spring around this sleeve and having one end secured to the extended arm or lever thereof and the other end of the spring secured to some fixed part of the pedal.

In practice the support is normally folded within the side portions of the pedal, as indicated, and held in such position by the cross portion of the spring thereof being held in the notches of the lever or arm extending from the sleeve. When it is desired to throw the support into its operative position, all that it is necessary to do is to move the lever so that the notch thereof is moved sufficiently to disengage it from the cross portion of the spring, when the said spring immediately throws the support into its open or operative position, and as soon as this has been done the spring which is secured to the sleeve returns the same to its normal position, where it is ready to engage and receive and automatically lock the support when it is thrown into its closed position.

Modifications in details may be resorted to without departing from the spirit of the invention or sacrificing any of its advantages. The pedal, as shown, is provided with a flange M upon one side, by which are designed to be secured detachably and removably the rubber blocks N, which may be slid thereinto or out of the same, so as to enable the rider to have a rubber or a rat-trap pedal, as he may desire.

Having thus described the invention, what is claimed as new is—

1. The combination with the pedal and a support mounted at one end thereof, of a spring serving as a brace and mounted to act on the support to normally hold the same in its extended position, a sleeve mounted upon a cross portion of the pedal, an arm extending from said sleeve and a lever on said arm adapted to engage the cross portion of said spring, substantially as described.

2. The combination with the pedal, of a shaft mounted at one end thereof, a support pivotally mounted on said shaft, a spring around said shaft having portions secured to the support and a spring-actuated pivoted catch adapted to engage the cross portion of said spring, substantially as described.

In testimony whereof I have signed this specification in the presence of two subscribing witnesses.

WILLIAM J. SIMONIS.

Witnesses:
ED. P. SIMONIS,
HENRY DAME.